United States Patent [19]

Hardiman

[11] Patent Number: 5,926,223
[45] Date of Patent: Jul. 20, 1999

[54] ADAPTIVE VIDEO DECOMPRESSION

[75] Inventor: James M. Hardiman, Mendon, Mass.

[73] Assignee: Media 100 Inc., Marlboro, Mass.

[21] Appl. No.: 08/968,795

[22] Filed: Nov. 6, 1997

Related U.S. Application Data

[63] Continuation of application No. 08/524,774, Sep. 7, 1995., abandoned, which is a continuation of application No. 08/048,782, Apr. 16, 1993., abandoned

[51] Int. Cl.⁶ .................................................. H04N 7/24
[52] U.S. Cl. .................................................... 348/405
[58] Field of Search ................................ 348/390, 402, 348/405, 413, 416, 419, 415, 409, 384; 382/251, 252, 253; 395/600, 520, 521; H04N 7/13, 7/133

[56] References Cited

U.S. PATENT DOCUMENTS

| | | | |
|---|---|---|---|
| 4,704,730 | 11/1987 | Turner et al. | 381/36 |
| 4,970,663 | 11/1990 | Bedell et al. | |
| 5,032,927 | 7/1991 | Watanabe et al. | 358/335 |
| 5,038,209 | 8/1991 | Hang | 358/136 |
| 5,045,940 | 9/1991 | Peters et al. | |
| 5,061,924 | 10/1991 | Mailhot | 341/76 |
| 5,122,875 | 6/1992 | Raychaudhuri et al. | 348/390 |
| 5,146,564 | 9/1992 | Evans et al. | 395/250 |
| 5,216,518 | 6/1993 | Yamagami | 358/426 |
| 5,228,028 | 7/1993 | Cucchi et al. | 370/94.1 |
| 5,287,420 | 2/1994 | Barrett | 382/233 |
| 5,355,450 | 10/1994 | Garmon et al. | 395/162 |
| 5,414,796 | 5/1995 | Jacobs et al. | 395/2.3 |
| 5,517,583 | 5/1996 | Horiuchi et al. | 382/239 |
| 5,577,190 | 11/1996 | Peters | 395/501 |
| 5,636,316 | 6/1997 | Oku et al. | 386/112 |

FOREIGN PATENT DOCUMENTS

| | | |
|---|---|---|
| 0 447 203 A2 | 9/1991 | European Pat. Off. |
| 0 447 203 A3 | 9/1991 | European Pat. Off. |
| 0 469 835 A2 | 2/1992 | European Pat. Off. |
| 0 503 956 A2 | 9/1992 | European Pat. Off. |
| 0 503 956 A3 | 9/1992 | European Pat. Off. |
| 0 506 294 A2 | 9/1992 | European Pat. Off. |
| 0 506 294 A3 | 9/1992 | European Pat. Off. |
| WO 91/14339 | 9/1991 | WIPO. |
| WO 93/12613 | 6/1993 | WIPO. |

OTHER PUBLICATIONS

News Release entitled "Media 100™ —Industry's First Online, Nonlinear Video Production System Introduced by Data Translation's Multimedia Group" dated Jan. 11, 1992.
"Multimedia Group Strategy and Media 100™ Backgrounder" dated Feb. 1992.
"Announcing a totally new concept in the field of video post production" distributed Jan. 1992.
EPO Search Report, Apr. 9, 1996.
Bolton et al., "A Complete Single–Chip Implementation of the JPEG Image Compression Standard", IEEE Custom Integrated Circuits Conference (1991). Month not available.
Ogawa et al., "A Single Chip compression/Decompression LSI Based on JPEG", IEEE Transactions on Consumer Electronics, No. 3, Aug. (1992).
Ackland et al., "A Video–Codec Chip Set for Multimedia Applications", AT&T Technical Journal, No. 1,, Jan./Feb. (1993).
Electrical Design News, IC acts as JPEG image–compression coprocessor, No. 5, Mar. 4, (1993), Newton, MA.

*Primary Examiner*—Bryan Tung
*Attorney, Agent, or Firm*—Fish & Richardson P.C.

[57] ABSTRACT

A method of decoding data packets of an encoded video program using a decoder that is controlled by decoding parameters loaded into control registers, the method including sequentially acquiring data packets that include decoding parameters and associated encoded video data, and processing each of the packets as it is acquired by storing the decoding parameters from the packet into the control registers and decoding the encoded video data using the associated decoding parameters.

8 Claims, 9 Drawing Sheets

```
enum Packet_Type {
    ...
    PT_VideoFrameRequest,
    PT_AudioFrameRequest,
    PT_VideoFrameDiscard,
    PT_AudioFrameDiscard,
    PT_PlaySetup,
    PT_StopPlay,
    ...
};

enum Subsample_Mode_t
{
    k_Off,              // stop at end of frame
    k_Halt,             // halt subsampling immediately
    k_One_Frame,        // subsample only one frame, then halt
    k_Half_Speed,       // NTSC = 15    PAL = 12.5  frames/sec
    k_Full_Speed        // NTSC = 29.97 PAL = 25    frames/sec
};

struct message_packet {
    unsigned char    length;        // packet length in 32-bit words
    Socket_Number    src;           // source socket number
    Socket_Number    dst;           // destination socket number
    enum Packet_Type type : 8;      // discriminant for the union
    long             seqNum;        // sequence number
    union {
        struct frame_request {
            long     frame;         // frame requested -- timestamp
        };
        struct frame_descriptor {
            long     frame;         // frame ID
            long     address;       // buffer's address in host RAM
            short    fOCount;       // size of frame
        };

... other variants of the message packet
    };
};
```

FIG. 8

During input:

ADAPTIVE VIDEO DECOMPRESSION

This is a continuation of application Ser. No. 08/524,774 filed on Sep. 7, 1995, now abandoned, which is a continuation of Ser. No. 08/048,782 filed Apr. 16, 1993, now abandoned.

CROSS REFERENCE TO RELATED APPLICATIONS

Patent applications U.S. Ser. No. 08/049,100, filed Apr. 16, 1993 entitled "Displaying a Subsampled Video Image on a Computer Display," U.S. Ser. No. 08/049,987, filed Apr. 16, 1993, entitled "Synchronizing Digital Audio to Digital Video," U.S. Ser. No. 08/048,490, filed Apr. 16, 1993, entitled "Video Peripheral Board Exercising Busmaster Control Over a System Bus of a Host Computer (As Amended)," and U.S. Ser. No. 08/048,458, filed Apr. 16, 1993, entitled "Adaptive Video Compression" filed herewith, are incorporated herein by reference.

BACKGROUND OF THE INVENTION

The invention relates to compression coding of a video program, and more particularly to an adaptive method for encoding successive frames of the video program.

As the costs of high-resolution color computer displays and processing power come down, one of the emerging applications for microcomputers is video post production—displaying and editing video images using the display of the computer as the monitor during the editing process. In order to use a microcomputer in a video editing system, a video source, typically a video tape recorder, is read and stored in digital form on the disk of a computer. The video may be edited in digital form and written back to a video device. Video editing presents a large computational and storage demand, easily seen in the sheer data volume of a video program—30 frames per second, over 300,000 pixels per frame, and several bits per pixel. In order to reduce the data volume, the video image data can be compressed as they are read, e.g., from video tape, and stored on disk. The data are then decompressed when viewed during editing or playback.

Selecting a video data compression method is a tradeoff between quality and quantity. More aggressive compression methods will reduce the amount of compressed data, but may result in lower-quality decompressed images. Generally, recovering the quality of the decompressed image requires the use of less-aggressive compression. Data compression algorithms generally have one or more adjustable parameters that control this tradeoff between quality and quantity; these coefficients are called "quantization factors" or "Q-factors."

The amount of compressed data produced for a frame of a video program will vary frame-to-frame as the content of the frames varies. In a known prior video compression method, a single set of Q-factors was used to encode each clip of a video program to be edited. The result was that the easy-to-compress program material, material that could have retained adequate quality even at more aggressive compression levels, consumed more data than required to present a good picture. Other harder-to-compress program material, material that required less-aggressive compression to avoid compression artifacts, was recorded at compromised quality. Additionally, when such material was edited, the editor was constrained to edit together only material that had been recorded with the same Q-factors.

SUMMARY OF THE INVENTION

The invention features, in general, a method for decompressing video data by adjusting decoding parameters as the video is being decompressed. The method enables real-time adjustments in the decoding method to match the adjustments that had been used in encoding. In the method, the encoded video program comprises a sequence of data packets. A decoder used in the method has control registers holding decoding parameters that control the decoding method applied by the decoder. The method includes the steps of: acquiring each of the data packets in sequence, each data packet of the video program including decoding parameters and encoded video data, and processing each of the data packets as it is acquired. Each data packet is processed by storing the decoding parameters into the control registers, and decoding the encoded video data by the decoder as specified by the stored decoding parameters.

Preferred embodiments may include the following features. The decoding includes decompressing the coded video program from a compressed form using decompression parameters as the decoding parameters. The decompression parameters include a quantization factor used in compressing source video data to produce the encoded video program, a larger quantization factor resulting in compression of the video data to encoded video data that consumes more storage space and evidences fewer compression artifacts than compression of the source video data using a smaller quantization factor. The acquired data packet is acquired through a demultiplexer, the demultiplexer routing the decoding parameters to the control registers and the encoded video data to the data input terminal of the decoder. The data packet also includes a data count, the data count specifying the number of words of encoded video data in the data packet, and storing the data count into a storage register. The data count is used by a state machine that controls the loading of decoding parameters. Each data packet may describe one field of a sequence of frames of interlaced video.

The invention features the following advantages. The method, when used in conjunction with an adaptive coding method, enables real-time adjustments in the parameters used to decompress previously compressed video to match the Q-factor setting used when the video program was initially compressed. Because each frame of the compressed video includes all parameters required for its decoding, a video program including segments that had been encoded with completely different sets of coding parameters at different times can used together and decoded and played back as a unit. The video encoding parameters thus can be changed in future releases of the editing software without damaging the decodability or editability of old compressed data files.

Other advantages and features of the invention will be apparent from the following description of a preferred embodiment thereof and from the claims.

DESCRIPTION OF THE PREFERRED EMBODIMENTS

A preferred embodiment will now be described.

DRAWINGS

FIG. 8 shows the data structures by which the host communicates with the peripheral.

OVERVIEW

Figure 1:
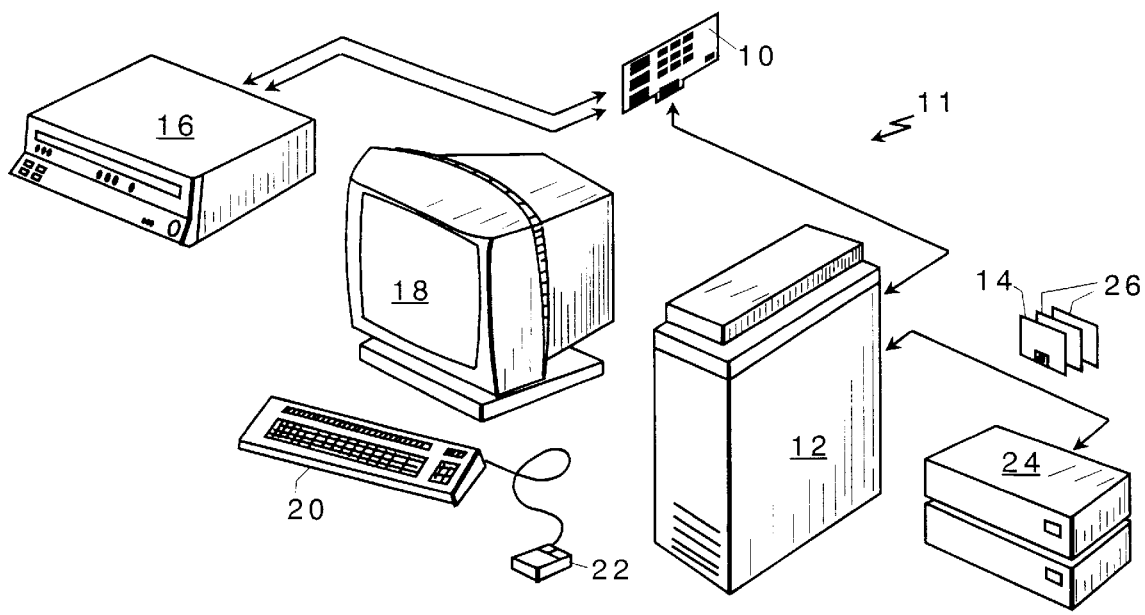
FIG. 1 is a diagrammatic perspective view of components used in a video editing system operating according to the invention.
Figure 2:
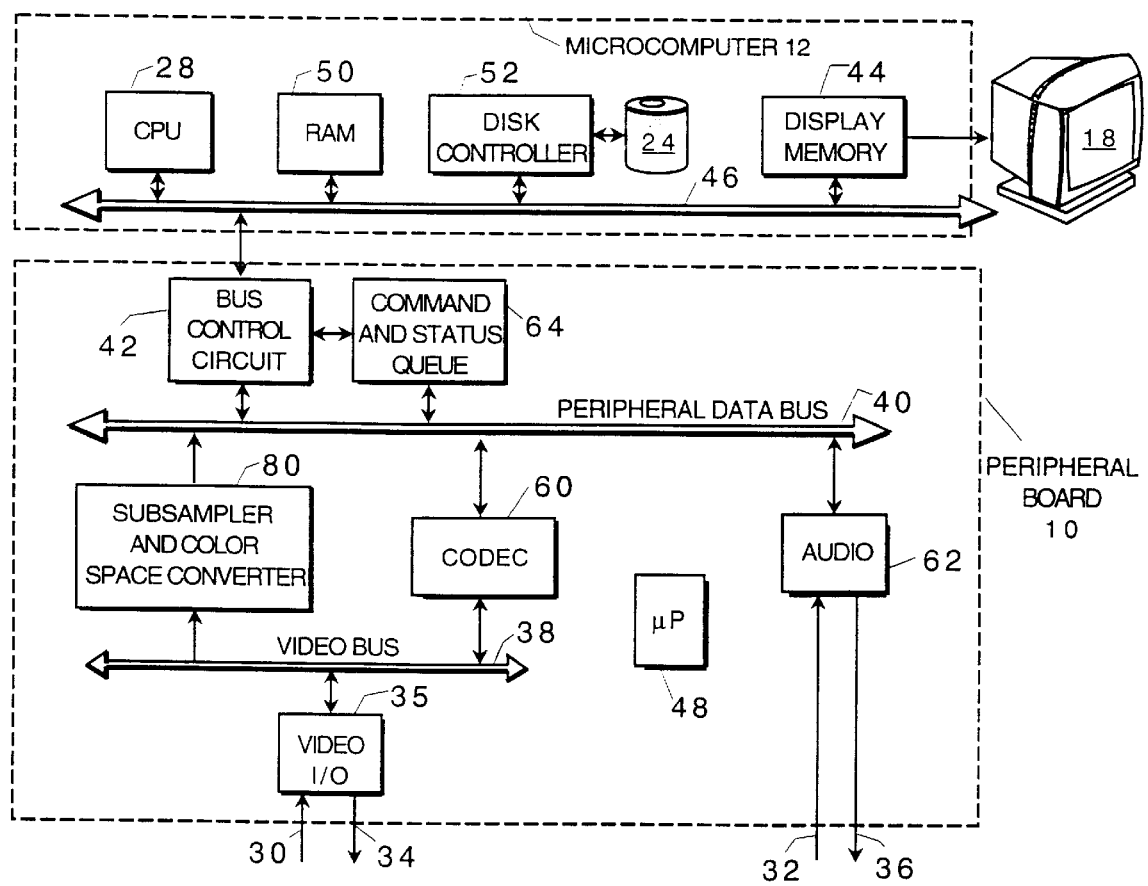
FIG. 2 is a block diagram of a host computer and a video peripheral board used in the system of FIG. 1.

Referring to FIGS. 1 and 2, video editing system 11 includes peripheral board 10 that plugs into host computer 12. Other components include video tape recorder (VTR) 16, monitor 18, keyboard 20, mouse 22, and mass storage disk 24. The software providing video editing functionality is divided into two portions, one portion 26 that executes on the host computer's central processing unit (CPU) 28, generally providing a user interface and supervision, and one portion 14 that executes on the peripheral board, generally controlling the peripheral board, data transfer within the peripheral board, and data transfer between the host computer and the peripheral.

In video editing system 11, video is read through video input port 30, and audio is read through audio input port 32. As they is read, the video is digitized and compressed, and the audio is digitized. The video and audio are stored on the disk 24. The compressed video/audio data may be decompressed and played back onto display 18 and speakers (not shown). Video editing software 26 allows a user to assemble portions of the compressed video and audio into a video/audio program. As the user edits the program, he can play it and rearrange it in small increments, as small as a single field, or in assembled combination. Once the user is satisfied with the resulting program, it can be output at full frame rates through video output port 34 and audio output port 36 to a video capture device, e.g., VTR 16, or to a broadcast device.

Referring to FIG. 2, the peripheral board has video and audio ports 30–36 (to connect VTR 16 or other video device), bus control circuit 42 (to interface with host computer 12), various signal processing paths, and supervisory microprocessor 48. The paths include a two-way path through a compression/decompression coder/decoder (CODEC) 60 to transfer digitized video to or from host computer disk 24, and a one-way color-space conversion (CSC) and subsample path to display digitized video on host computer display 18. Video I/O port circuit 35 converts the video data from the VTR's analog form, e.g. NTSC or PAL, to a digital form, e.g., YUV 4:2:2 format, and puts the digital video on video bus 38. (Video bus 38 can also be written by CODEC 60 during video decompression.) A microprocessor 48 controls the components of the peripheral board.

During inputting of source video, CODEC 60 takes the YUV format video from video bus 38, compresses it into a compressed form, writes it to peripheral data bus 40. Bus control circuit 42 takes the compressed video from peripheral data bus 40 and stores it into buffers in the host's RAM 50. Host CPU 28 periodically flushes the buffers to disk 24.

During playback, the process is reversed: host CPU 28 reads the compressed video data from disk 24 into buffers in RAM 50. Bus control circuit 42 copies the data from the buffers to CODEC 60, which decompresses the data, and outputs them to video data bus 38. From there, the decompressed video data can be displayed to the host's display 18 through the subsample path, and/or output through video output port 34.

During recording and playback, the compression or decompression method is adapted to account for variations in the source material by methods that will be described in detail below.

Simultaneously, an audio channel transfers data from/to the VTR (or other audio source) to/from the peripheral's data bus 40 through an audio controller 62 and an audio I/O port 32, 36.

Figure 3:
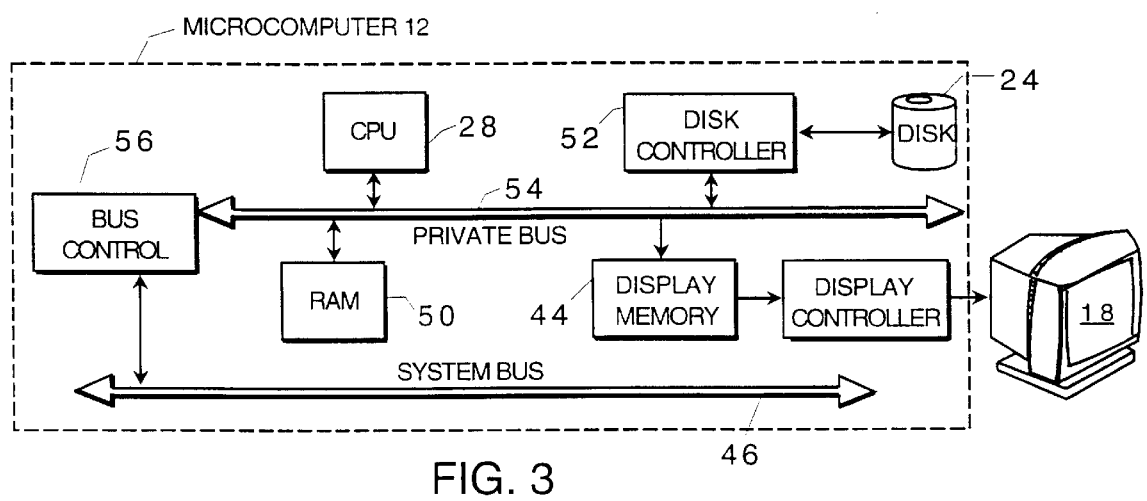
FIG. 3 is a block diagram of an alternate organization of the host computer.

In an alternate organization of the host computer shown in FIG. 3, host computer's CPU 28, display memory (also called a "frame buffer") 44, main memory 50, and/or disk control 52 components may transfer data through a bus 54 private to host computer 12, with bus control interface 56 between the private bus 54 and system bus 46. In this case, the peripheral's bus control circuit 42 transfers data to/from the system bus 46, and the host's bus control interface 56 further directs the data to/from the devices on the host computer's private bus 54.

Figure 5:
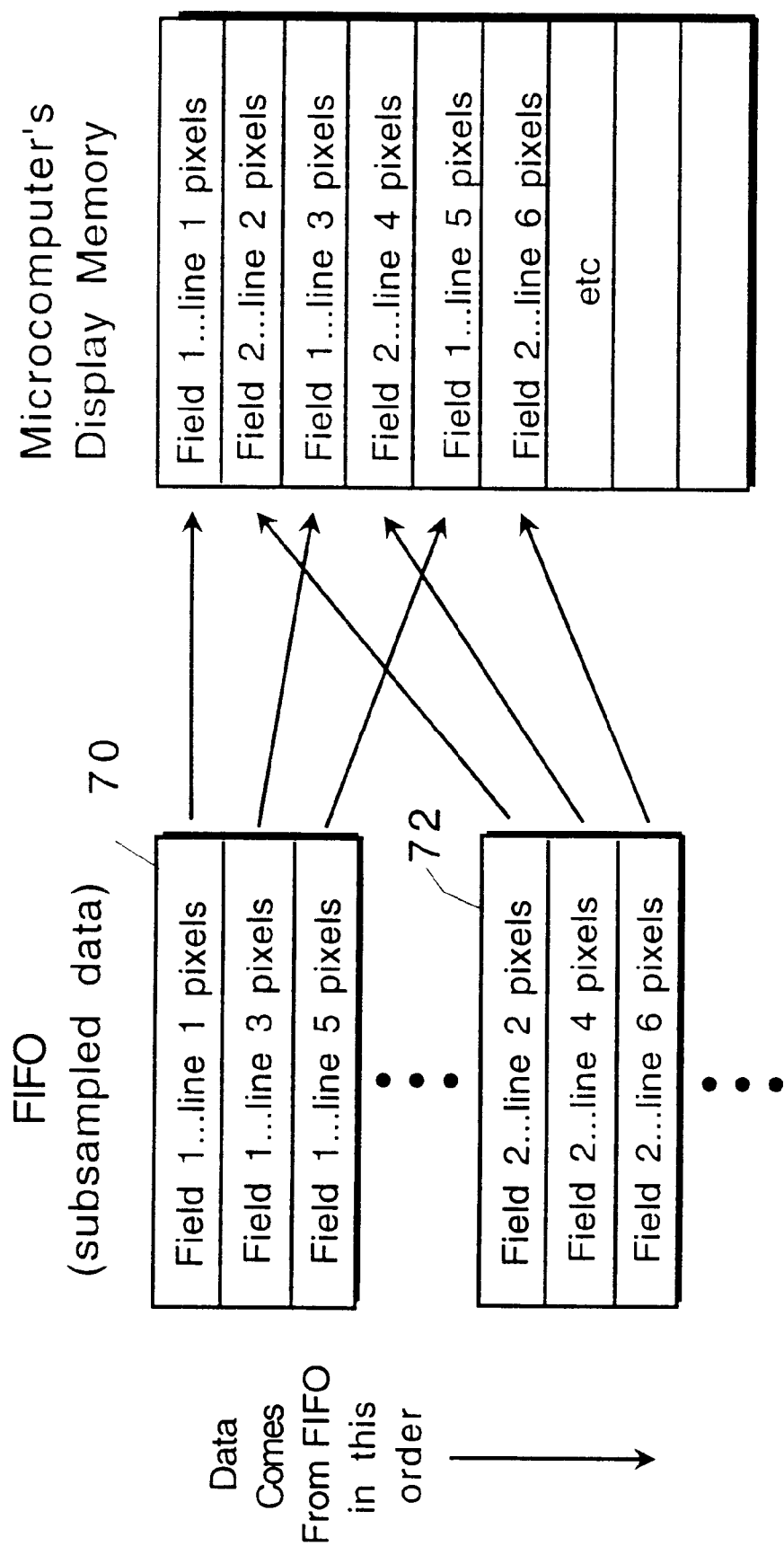
FIG. 5 is a diagram illustrating de-interlacing, an operation performed by the peripheral board of FIGS. 2 and 4.

Referring to FIG. 5, some video formats, e.g., NTSC, interlace the scan lines of a frame. That is, rather than scanning a frame continuously left-to-right top-to-bottom, a frame is divided into two fields 70, 72. The first field 70 includes all of the odd-numbered scan lines, and the second field 72, transmitted after the entire first field is complete, includes all the even-numbered scan lines. The fields of the assembled frame are scanned alternately.

In any video signal, there is a vertical blanking period to reset the retrace from the bottom of the screen to the top of the screen. During the vertical blanking period, the electron beam is stopped so that it will not overwrite the previous field. During the vertical blanking period, there occurs a synchronization pulse called the "vertical synch" pulse. In interlaced formats, there are two vertical blanking periods per frame, and thus two vertical synch pulses, one at the end of each field. The two vertical synch pulses can be distinguished by their timing relationships to the actual image data of the two fields of a frame.

A common method for compressing image data uses a JPEG CODEC. In JPEG coding, each frame or field is encoded as a still image independently of other frames in the video. A 2-dimensional discrete cosine transform (DCT) is computed, typically on a square raster of the image. The JPEG standard defines "Q-factors" that may be varied to tune the compression to the chrominance and luminance characteristics of the source video material and to trade off quality of the decoded image (absence of compression artifacts) against storage space consumed by the compressed image. For instance, if some of the Q-factors are very large, they reduce corresponding video luminance or chrominance contributions to zero, effectively eliminating them from the compressed form, and thus reducing the amount of data used to represent the image, but also removing their contribution to the decompressed image. For a full description of Q-factors, see Pennebacker and Mitchell: *The JPEG Still Image Data Compression Standard* from VanNostrand and Reinhold, incorporated herein by reference.

During compression, peripheral board 10 has a "target" data size for encoding each field of video, typically in the range of 20–25K bytes. If the amount of data generated for a field overflows this target by a certain percentage, then the Q-factors are adjusted up to realize more aggressive compression of the next field. Similarly, if the amount of data generated for a field underflows the target by a certain percentage, then the Q-factors are adjusted down to achieve better quality in following fields.

Though the preferred embodiment allows Q-factors to change as often as each field boundary, the granularity can be any small portion of a video program, for instance a frame or a small number of frames, or a portion of a frame or field. Larger granularity will conserve storage space for encoding fewer Q-factor changes. Finer granularity allows the compressed video to be edited at finer boundaries, since the current embodiment only allows editing splices at a Q-factor boundary.

STRUCTURE

Figure 4:
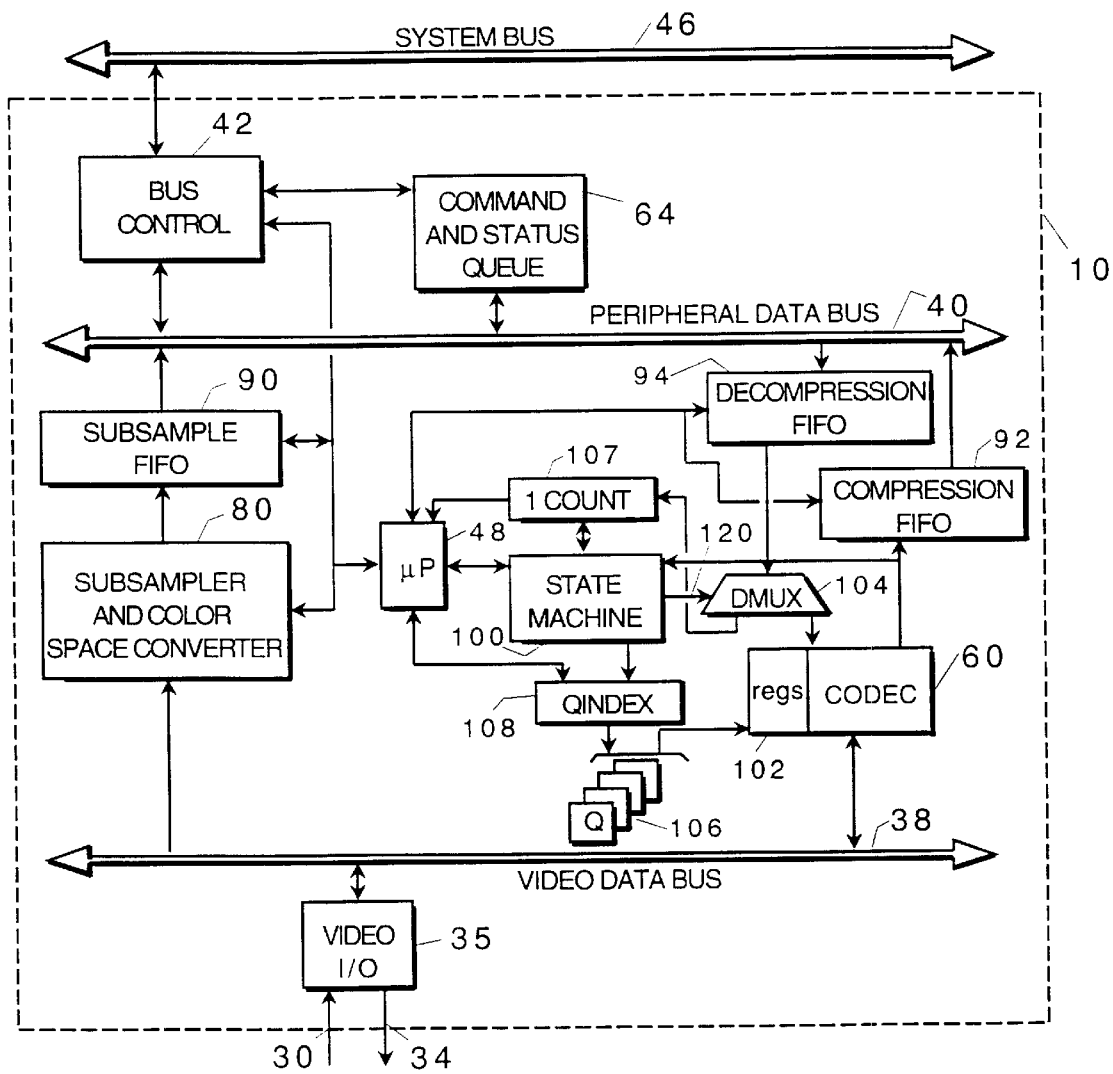
FIG. 4 is a block diagram detailing some of the features of the video peripheral board of FIG. 2.

FIG. 4 shows the compression/decompression path through peripheral board 10 in more detail. Video data bus 38 carries video data generated by any of several components, e.g., video input port 30 or the decoder portion of CODEC 60. Data bus 40 carries subsampled video from the subsample path or coded video to/from the CODEC path. FIFOs 90, 92, 94 buffer data to/from data bus 40. Both the path from decompression FIFO 94 and the path to compression FIFO 92 are monitored by state machine 100. CODEC 60 has control registers 102 that control its operation. State machine 100 may write control registers 102 from a table of Q-factors 106. One-count register 107 holds a count of the compressed data input to or output from CODEC 60.

CODEC 60 is implemented as a three chip set from LSI Logic, the L64765QC-30 CSRBC, the L64735QC-35 DCT processor, and the L64745QC-30 JPEG coder. Among the control registers 102 of CODEC 60 are a set of 128 Q-factor registers, each 8 bits wide, 64 registers for chrominance and 64 for luminance. The data sheets for these chips are incorporated by reference.

Q-factor table 106 is a memory that can hold up to 256 Q-factor sets, representing 256 different quality settings. Each Q-factor set constitutes 128 8-bit values, corresponding to the 128 Q-factor control registers of CODEC 60. The Q-factor table is accessed by index; that is, each Q-factor set is accessed by an associated integer between 0 and 255. Although Q-factor table 106 has space for up to 256 Q-factor sets, the invention may operate with a smaller number actually filled, for instance four. The filled entries are ordered in their effect on compression; that is, a higher-indexed Q-factor set will result in a lower-quality but a higher-compression, lower-storage representation of a frame or field. Other organizations of the Q-factors in the Q-factor table are possible, as long as microprocessor 48 is programmed to take advantage of the organization.

The value of QINDEX register 108 determines which Q-factor set is currently loaded into the CODEC. QINDEX register 108 is readable and writable by state machine 100.

Figure 6:
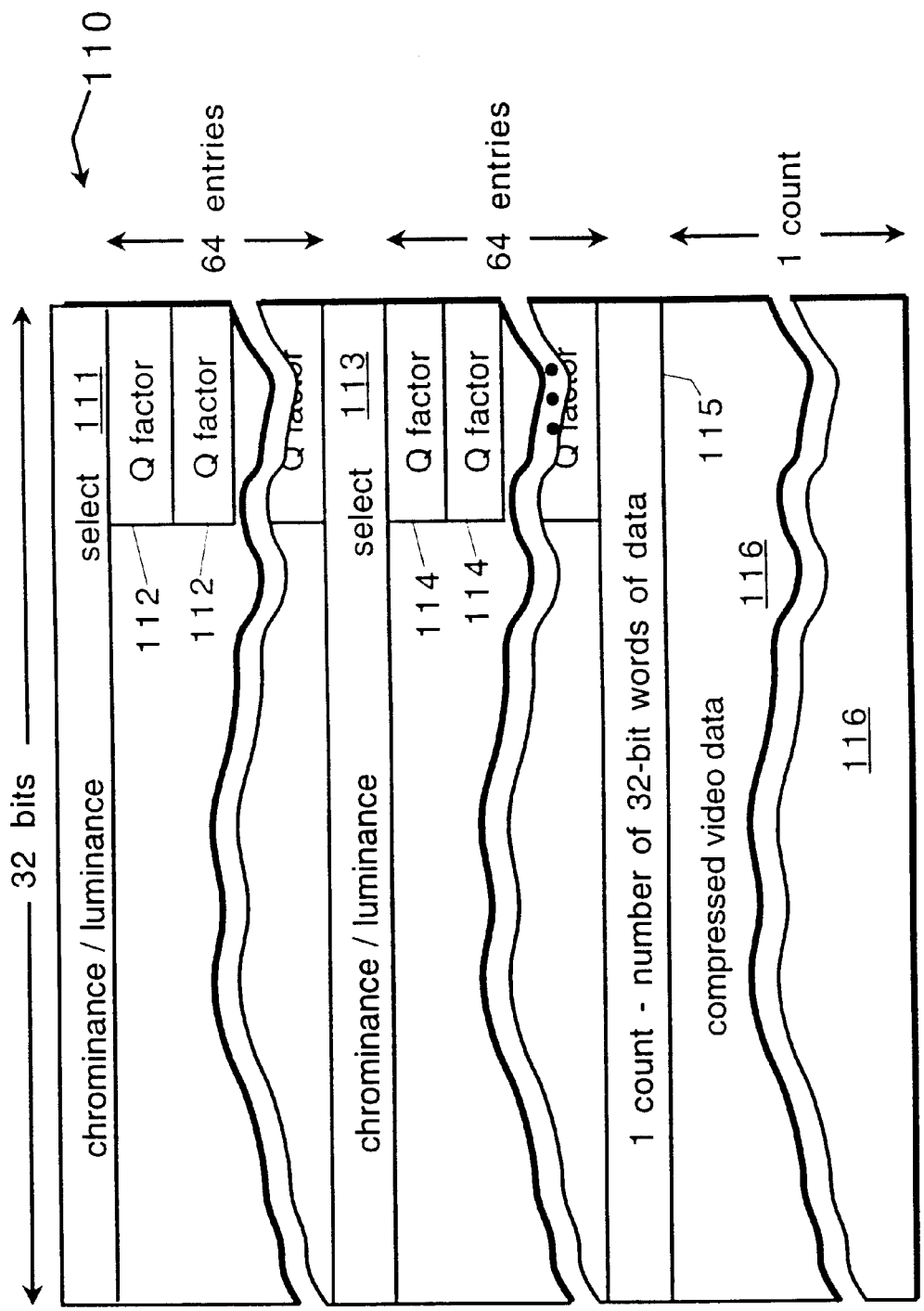
FIG. 6 shows the format for a packet of compressed video data.

FIG. 6 shows data packet format 110 for an encoded video field as it is stored on disk. A full Q-factor set and data count are stored in the 131-word packet header. The Q-factors are stored as 64 chrominance entries and 64 luminance entries 112, 114. Identifier flags 111, 113 identify which 64 entries are chrominance and which are luminance. Each Q-factor is 8 bits, but in the packet, a Q-factor is padded out to 32 bits. A 32-bit count 115 indicates the number of words, lcount, of compressed data to follow, followed by the lcount words of compressed data 116 of the field image. Thus, each video field has its decode key, Q-factor set 112, 114, stored with it. Successive fields may be encoded with identical Q-factors, but the compressed images of the fields will nonetheless be stored with full, identical, Q-factor headers 111–114. This enables Q-factor changes to occur at any field boundary of the compressed video data.

Referring again to FIG. 4, state machine 100 is implemented in PALs. During compression coding, CODEC 60 counts the amount of compressed data generated; state machine 100 moves this count to lcount register 107 at the end of each field. During decoding, state machine 100 counts the words of a data packet encoding a video field to direct the successive words of the packet to the correct components of peripheral board 10. In particular, state machine 100 clocks Q-factor header 112, 114 into the Q-factor registers of CODEC 60 by selecting the CODEC output of demultiplexer 104 and the "control" mode of the CODEC. The next 4 bytes, lcount, are channeled to the lcount register via select signal 120 for demultiplexer 104. Finally, the state machine sets the "data" mode for the LSI chip set and clocks the actual image data into CODEC 60 for decompression.

Figure 7:
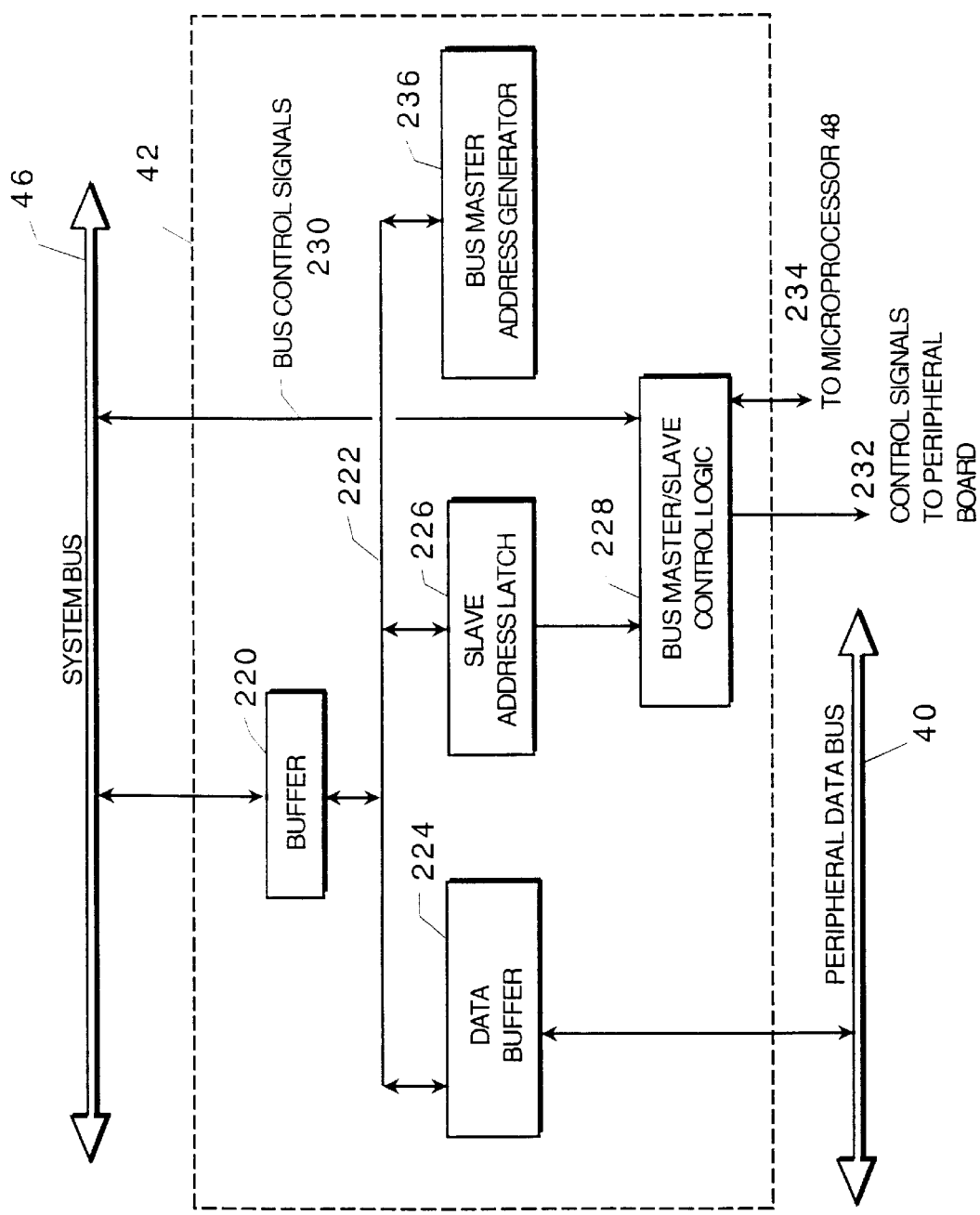
FIG. 7 is a block diagram of the bus control circuit of FIG. 2.

Referring to FIG. 7, bus control circuit 42 interfaces system bus 46 to peripheral board 10. Buffer 220 buffers the bus data and address lines of system bus 46. Data buffer 224 buffers data to be sent to and received from system bus 46, and slave address latch 226 latches the addresses. Peripheral board 10 may act as bus master; when in this mode, bus master address generator 236 (in conjunction with microprocessor 48) generates the addresses for these bus transactions. Bus master/slave control logic 228 generates and receives bus control signals 230 to/from the bus and passes the signals 232, 234 from/to microprocessor 48 and other components of the peripheral board.

Microprocessor 48 and bus control circuit 42 cooperate to transfer data between the FIFOs 90, 92, 94 of the peripheral board and the host's RAM 50 efficiently. Microprocessor 48 monitors the fill level of the FIFOs, the amount of space remaining in the ring buffers in host RAM 50, and the amount of data in the CODEC (during record) or a packet (during playback) remaining before the end of a field, and issues commands to bus control circuit 42 to transfer a specified number of words of data to/from a FIFO from/to a specific address of host RAM 50. To reduce bus traffic, bus control circuit 42 breaks the request from microprocessor 48 into smaller blocks, typically 16 32-bit words of data per block. This blocking improves efficiency relative to transferring data one 32-bit word at a time, but also prevents any one transfer from tying up the bus for an unacceptably long time.

The preferred host computer is an Apple MacIntosh, model Quadra 950 or faster.

The video editing session is under the control of software 26 that runs on the CPU of the host computer. This software provides a graphical user interface to the human user for control of the video editing session, and supervises the operation of peripheral board 10.

In the preferred embodiment, microprocessor 48 controlling the peripheral board is a Motorola MC68030. A relatively fast microprocessor is chosen to satisfy the latency demands for real-time service. The components of peripheral board 10 under the control of microprocessor 48 include bus control circuit 42, subsampler and color space converter 80, and CODEC 60. The control is effected by monitoring subsample FIFO 90, compression and decompression FIFOs 92, 94, FIFOs in the audio path, and messages from the host CPU.

Host CPU 28 and peripheral board 10 communicate via the peripheral's command and status queue 64. The command and status queue is a bidirectional FIFO, analogous to a multi-lane highway with a median strip between separating the messages sent in one direction from those sent in the other. The queue occupies a single address on the system bus; to write a multi-word message to the peripheral, the host writes in turn each word of the message to the queue address. Microprocessor 48 drains these messages from the command queue 64 and acts on each in turn. The use of these data structures and messages will be discussed below, in connection with FIG. 8 and the subsample and playback operations.

Referring again to FIG. 4, video data bus 38, subsampler and color space converter 80, and CODEC 60 are constrained to operate at the rate of the video I/O system. But host computer 12, with its responsibility for servicing user programs and interrupts from various peripherals, cannot provide real-time service. Compression FIFO 92 and decompression FIFO 94 decouple the real-time operation and requirements of the synchronous video data bus 38 from the inherently asynchronous operation of host computer 12 and peripheral data bus 40. Compression FIFO 92 and decompression FIFO 94 are each 32 bits wide, 16K words deep, and use 25ns parts. The coordination of flow control between the various FIFOs will be discussed below.

OPERATION

As the host computer is turned on and executes its bootstrap procedure, it queries the display system to find out whether an external display device resides on the system bus (as shown in FIG. 2), or whether the display is on the host private bus (as shown in FIG. 3), and at what addresses the display memory is mapped. The host also queries each of the peripheral boards in the expansion slots, and establishes memory addresses for each of them.

A part of its power-up routine, peripheral board 10 runs a self-test diagnostic (stored in ROM on peripheral board 10) and then waits for software 14 to be downloaded from host computer 12 to microprocessor 48. When video editing software 26 starts on host computer 12, it takes the host out of virtual memory mode so that peripheral 10 will have access to the address space of host 12. Host software 26 then downloads peripheral software 14 to the peripheral board. The downloaded software 14 institutes hand-shaking within peripheral board 10, and then hand-shaking with host CPU 28.

As the software 26 on the host computer begins execution, the host builds in its RAM a table of Q-factor sets, also accessed by index, to be copied into the header area 111–114 of each field of compressed video. The host also downloads the peripheral's Q-factor table 106, in uncompressed form, to the peripheral. An initial, default set of Q-factors is loaded into CODEC 60. Host 12 allocates a disk buffer in its RAM 50 and tells the peripheral microprocessor 48 the address of the buffer.

Software 26 running on the host CPU 28 offers the user a number of choices. Among the choices are to copy video data from VTR 16 to disk 24 or vice versa. In the former case, while the subsample path displays the video on host display 18, CODEC 60 will simultaneously compress the video data, and bus control circuit 42 will copy the compressed image data to disk 24. If the user asks to view data stored on disk 24, or to decompress and copy the compressed video from disk 24 to VTR 16, bus control circuit 42 will fetch the data from disk 24 through system bus 46. The data will be buffered in decompression FIFO 94, then decompressed in CODEC 60.

When the user asks the system 11 to compress video data, the digitized video data are presented to video bus 38, for instance by VTR 16 and video input port 30, and consumed by CODEC 60. CODEC 60 compresses the video; the compressed data are buffered in compression FIFO 92. State machine 100 gets the data count from CODEC 60 and stores it into lcount 107 register, and based on that count sets the QINDEX register 108, which in turn selects the Q-factors 106 that will be used to encode the next field. From compression FIFO 92, the compressed video data are copied into the host computer's RAM 50. There, the host copies its copy of the Q-factors used to encode the data into the packet header 111–114 with the compressed data. Then, the compression parameters and the compressed data are written to disk 24 for storage.

The compression process will be described in more detail below.

The synchronous part of the encoding path, between video data bus 38 and compression FIFO 92, is largely under the control the pixel clock and vertical synch pulse generated by the video I/O port. Each field begins with a vertical blanking interval, with its vertical synch pulse. On receiving the vertical synch, state machine 100 captures the value of variable QINDEX 108, the index into the Q-factor table 106 for the set of Q-factors used to encode the upcoming field. QINDEX register 108 is protected from being updated while state machine 100 is capturing its value.

While the QINDEX value is being captured, state machine 100 loads into the CODEC 60 gamma correction values that determine the color mapping from input video to output video values. (Programmable gamma values allow the coder to compensate for color differences between displays, for instance variations in the color response of different phosphors between different models of CRT.) After QINDEX 108 has been captured and the gamma values loaded, state machine 100 loads the set of the Q-factor table 106 indicated by the value of QINDEX into CODEC 60 by serially reading the Q-factors out of the table 106 and writing them to the CODEC's control registers 102.

At the end of each field, state machine 100 places CODEC 60 in compress mode, and generates a vertical synch pulse to CODEC 60. During the blanking interval, peripheral board 10 prepares for the upcoming field by loading gamma and Q-factor values. The first horizontal synch pulse signals the first line of the next field. CODEC 60 has been programmed to ignore the first few lines of the video (reserved for closed caption information, etc.), and with values that tell the number of scan lines and pixels per scan line, etc. CODEC 60 begins compressing the portion of the field that contains the actual image data.

After the digitized video data from video bus 38 are compressed through CODEC 60 into compression FIFO 92, state machine 100 requests the count of compressed data from CODEC 60 and stores it into lcount register 107.

At the next vertical blanking interval and vertical synch pulse, microprocessor 48 examines the lcount 107 value. If the amount of data for the just-compressed field exceeds a predetermined upper threshold, that is if it exceeds the target amount of compression data by a predetermined percentage, then peripheral microprocessor 48 selects a different set of Q-factors from Q-factor table 106 by incrementing QINDEX 108. This new set of Q-factors will cause succeeding frames to be compressed more aggressively, reducing the amount of data representing future frames. Similarly, if the amount of data for a field drops below a predetermined lower threshold, that is, if it underflows the target by a percentage, microprocessor 48 decrements QINDEX to select a different set of Q-factors to reduce the compression, thereby increasing the amount of data that will be generated, but also improving the picture quality of succeeding frames. Similarly, if the encoded data overflow or underflow the target by twice the percentage window, the state machine will increment or decrement QINDEX by an appropriate amount, two in the preferred embodiment.

The Q-factors in each set may be tailored to the program material—for instance, for natural video vs. animation vs. technical. The threshold bands are about 10%.

Note that the Q-factors used to encode each frame are those computed as a result of compressing the previous frame. An advantage to this method is that no extra pre-compression computation is required: a frame need not be evaluated before encoding to determine its compression quality, nor need a frame be re-compressed if it is found to have been compressed with the "wrong" Q-factors.

The above steps are repeated for each field of the video at the rate determined by the video clocks. Once the compressed pixels are stored in compression FIFO 92, the remaining processing, discussed next, may proceed asynchronously. The following steps are timing constrained in that they proceed quickly enough to prevent compression FIFO 92 from overflowing.

Figure 9:
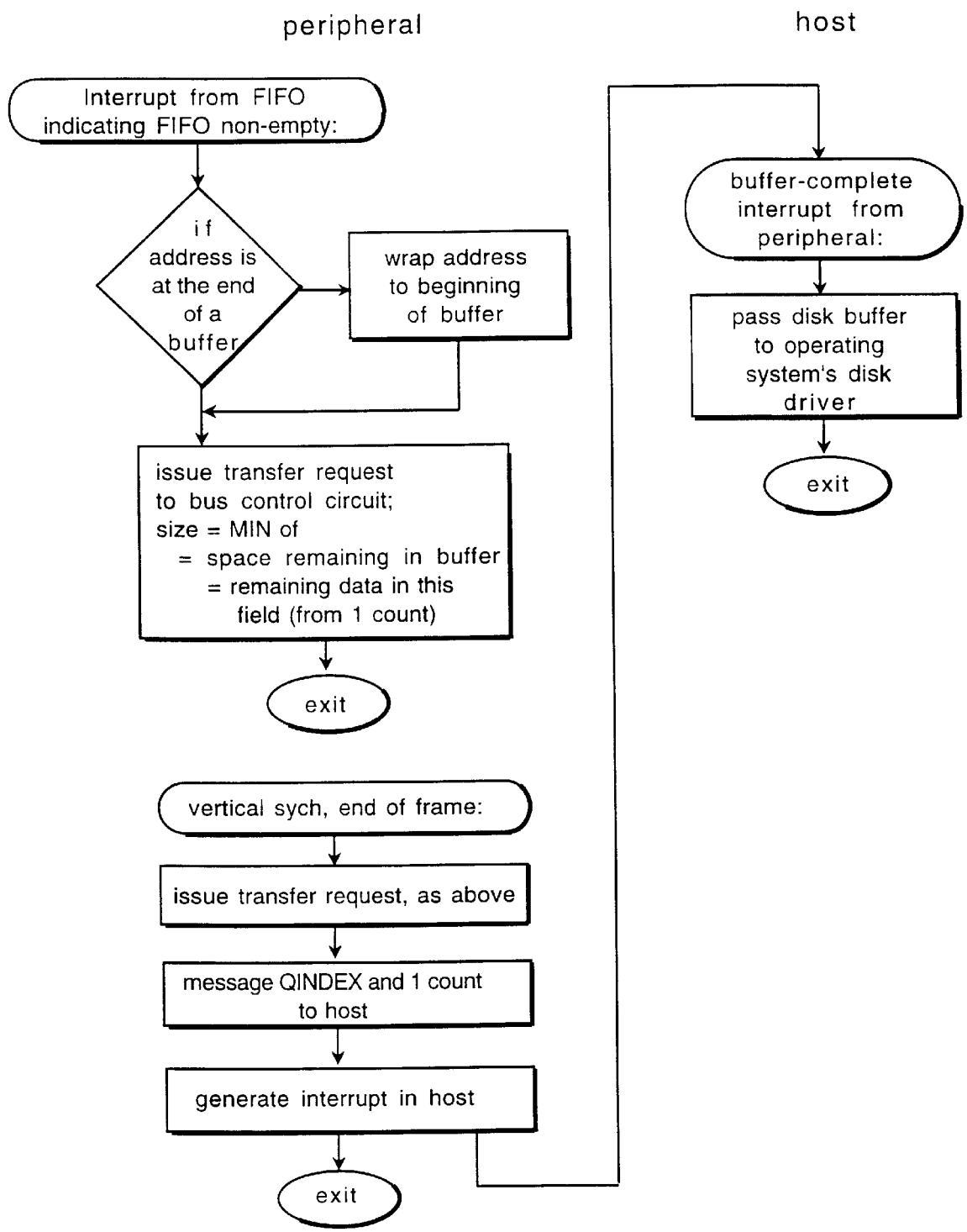
FIG. 9 is flow chart showing the operation of the system.

Referring primarily to FIG. 9, with reference to FIGS. 4 and 7, bus control circuit 42, with some assistance from the peripheral's microprocessor 48, transfers the compressed video data from compression FIFO 92 into disk buffers in the host's RAM 50. Bus control circuit 42 drains the data words from compression FIFO 92, and control logic 228 and address generator 236 block the data into 16-word blocks for bus transfer across system bus 46. Microprocessor 48 and address generator 236 account for the variable-length records counted by lcount register 107. At the beginning of each field, the address generator leaves 131 words in the disk buffer for header area 111–115 of a data packet. Microprocessor 48 counts the words used in each RAM buffer, and signals host CPU 28 when a buffer is complete and ready to be written to disk 24. Microprocessor 48 then provides the address of the next buffer to address generator 236.

At the end of each field, microprocessor 48 sends a message to host CPU 28. This message indicates the QINDEX value 108 that indexed the Q-factor set used to encode the frame, and the lcount value 107 of the number of words encoding the frame. Host CPU 28 indexes into its table of Q-factors, copying the appropriate entry into header 111–114 of the data packet. The lcount value may either be copied directly into the header 115 by bus control circuit 42, or may be copied by host CPU 28 from the "field complete" message. Alternately, microprocessor 48 may communicate the entire packet header 111–115, the Q-factors and lcount, to the host for verbatim insertion into the packet header. Thus, each encoded field has the data required for decoding packaged with it. Once the buffer is full and the Q-factors have been stored with the compressed data, host CPU 28 writes the buffer to disk 24.

Bus control circuit 42 and microprocessor 48 assume the entire real time burden of transferring the video data from CODEC 60 to buffers in the host's RAM 50. Transfer from the RAM buffer to disk 24 can be completed asynchronously by the host. The host's only responsibility during compression is to keep a sufficient supply of disk buffers available and empty for the peripheral's use during compression. The host maintains its supply of empty buffers by flushing the full buffers to disk 24.

When the user asks for decompression, for instance to play back a clip of previously-compressed video data, host microprocessor 28 and bus control circuit 42 assume the responsibility of keeping decompression FIFO 94 full by requesting data from the host computer's disk 24; this process will be discussed below. As CODEC 60 drains compressed data from decompression FIFO 94, state machine 100 sets CODEC 60 into a register load mode and counts off headers 112, 114 (64 8-bit entries each of the actual Q-factors) which are stored into the Q-factor registers of CODEC 60. Then, state machine 100 sets CODEC 60 into data decompress mode. State machine selects demultiplexer 104 to send the item, lcount 104, to lcount register 107. Then, the data are sent directly to CODEC 60 where they are decompressed and presented as digital video on video bus 38. Each 32-bit word of data provided to CODEC 60 decrements lcount register 107 by one, so state machine 100 can tell when it has presented all the image data of the field to CODEC 60.

Referring again to FIG. 8, for each frame it wishes to play back, peripheral microprocessor 28 sends a "PT_VideoFrameRequest" or "PT_AudioFrameRequest" message packet to host requesting the frame by timestamp ID indicated in member "frame." The peripheral queues up enough of these frame requests so that the host's buffer filling process will stay ahead of the peripheral's buffer draining process. The host translates that message into a request to the MacIntosh disk engine. Once the disk engine has put the data into RAM 50, the host CPU 28 sends a "PT_VideoFrameDescriptor" or "PT_AudioFrameDescriptor" packet back to the peripheral via command and status queue 64. This packet indicates the address in the host's RAM 50 at which the data have been read, and the data count. When microprocessor 48 and bus control circuit 42 have drained the data from buffers into decompression FIFO 94 and audio output FIFO 98, the peripheral changes the "type" of the packet to "PT_VideoFrameDiscard" or "PT_AudioFrameDiscard" and sends the packet back to the host through the command and status queue 64, interrupting host 28 to tell it to check the queue. The host puts the discarded storage back in its free pool.

The decompression operation may specify that a single frame (two fields) is to be decompressed, or that decompression is to be continuous until the peripheral board 10 receives a command to halt from the host 28. The single-frame mode is useful for compressing still graphics.

On a halt command, state machine 100 performs an orderly shut down of CODEC 60 by allowing it to complete decompressing any data it is working on, and preventing the loading of the next field's compressed data.

Microprocessor 48 is responsible for prioritizing tasks on the peripheral board. The subsample path is essentially always active displaying the video data on video data bus 38 onto the host's display 18, but in general any data movement through the CODEC path has precedence over the viewing operation: data loss during the tape-to-disk copying operation is effectively irreversible and should be prevented if at all possible. On the other hand, allowing the subsample path to lag the CODEC path—or omitting frames from the video display—is a failure with no lasting impact. The peripheral's microprocessor is responsible for maintaining the integrity of the copy stream by enforcing this priority. Microprocessor 48 controls the rate at which FIFOs 90, 92, 94 are unloaded, up to the saturation rate of system bus 46 of the host computer. thus, the system can selectively choose the rate at which the video data are sent to the display memory, thereby changing the frame rate of the subsampled video presented on the display. This flow control is effected by the peripheral microprocessor 48: it monitors the fill level of the CODEC's FIFOs 92, 94, FIFOs on the audio path, and subsample FIFO 90, and uses this information to control the peripheral's bus transactions. For instance, if either of CODEC FIFOs 92, 94 are approaching full, microprocessor 48 suspends the bus control circuit's draining of the subsample FIFO 90 and gives immediate attention to draining the CODEC FIFOs 92, 94. In practice, the subsample window is updated nearly in real time (i.e., at close to video rates), with delays limited to two to four frames.

Referring to the central loop shown in FIG. 9, the peripheral's microprocessor 48 monitors the FIFOs and directs data transfers. Microprocessor 48 allows the FIFOs to fill sufficiently to efficiently transfer data in blocks. For instance, subsample FIFO 90 will be blocked into blocks of 16 32-bit-wide words for transfer across system bus 46. The gap between blocks allows other operations, for instance CODEC copy operations, audio channel copy operations, or dynamic RAM refresh cycles, to preempt the stream of subsampled video data. The result is that the display stream is completely asynchronous—the display in the subsample window will often be split between showing parts of two frames for a fraction of a second, usually a time too short to be distinguished by the human eye. During times when the CODEC stream is very full, for instance immediately after a scene change from easy-to-compress material to hard-to-compress material (for instance to a new scene with many more sharp edges), bus control circuit 42 suspends unloading subsample FIFO 90 for several frames until the data volume over the copy stream subsides. Subsample FIFO 90 may overflow during this time. The peripheral's microprocessor 48 will then flush subsample FIFO 90, wait for the next frame or field boundary, and then restart the subsample video stream.

Other embodiments of the invention are within the scope of the claims.

What is claimed is:

1. A method of decoding an encoded video program in a video editing system implemented on a personal computer and a peripheral video board connected to an expansion slot of said computer, said peripheral board carrying a decompression decoder, the encoded video program comprising compressed video data for a plurality of frames stored on a randomly accessed mass storage device of said personal computer, said compressed video data comprising a sequence of data packets, said decompression decoder being controlled by quantization factors loaded into control registers of said decompression decoder, the method comprising the steps of:

acquiring at said peripheral board sequences of said data packets from said randomly accessed mass storage device, each said data packet of said encoded video program comprising a block of quantization factors, compressed encoded video data that are decodable by said block of quantization factors, and a data count that indicates the amount of compressed video data in a packet; and processing each of said data packets at said peripheral board as it is acquired from said computer by a method comprising the steps of:

storing a respective block of quantization factors into said control registers of said decompression decoder;

transmitting said data count of said packet to a state machine that controls said decompression decoder to count the compressed video data being input to the decompression decoder, inputting said compressed video data to said decompression decoder, and decompressing a respective portion of said compressed video data by said decompression decoder as specified by the respective block of quantization factors stored by said control registers.

2. The method of claim 1 wherein a demultiplexer is controlled by said state machine to access said data count in said data packet.

3. The method of claim 1 further comprising the step of:
   storing said data count into a storage register.

4. The method of claim 1 wherein each of said data packets describes one field of a sequence of frames of interlaced video.

5. The method of claim 1 wherein each of said data packets includes a field of compressed video data that is decodable by said block of quantization factors.

6. An apparatus for decompressing a digital representation of video data in a video editing system implemented on a personal computer and a peripheral video board connected to an expansion slot of said computer, the apparatus comprising:

a source of a plurality of frames of digital video data comprising a randomly accessed mass storage device of said personal computer, said digital video data comprising a sequence of data packets, each of said data packets comprising a block of quantization factors, compressed image data that are decodable by said quantization factors, and a data count that indicates the amount of compressed image data in a packet;

a buffer on said peripheral board for receiving said packets, a decompression decoder on said video peripheral board connected to receive said quantization factors and said compressed image data in said packets stored in said buffer for decompressing said compressed image data into decompressed image data, the decoder having control registers accepting said block of said quantization factors to alter the decompression method applied, an input port for accepting said compressed image data as input and an output port for outputting said decompressed image data corresponding to said compressed image data;

and a state machine that controls said decompression decoder and is connected to receive said data counts in said packets stored in said buffer to count the compressed image data in respective packets input to decompression decoder.

7. The apparatus of claim 6 wherein each of said data packets represents one field of an interlaced video frame.

8. The apparatus of claim 6 wherein each of said data packets in said source includes a field of compressed image data that is decodable by said block of quantization factors.

* * * * *